United States Patent [19]

Kordomenos et al.

[11] Patent Number: 4,485,199

[45] Date of Patent: Nov. 27, 1984

[54] THERMOSETTING COATING COMPOSITION COMPRISING POLYMERIC CATALYST

[75] Inventors: Panagiotis I. Kordomenos, Mt. Clemens; Kenneth R. Kurple, Anchorville, both of Mich.

[73] Assignee: Ford Motor Company, Dearborn, Mich.

[21] Appl. No.: 448,887

[22] PCT Filed: Jun. 14, 1982

[86] PCT No.: PCT/US82/00798

§ 371 Date: Jun. 14, 1982

§ 102(e) Date: Jun. 14, 1982

[51] Int. Cl.³ .............. C08L 63/10; C08L 33/02; C08L 61/28
[52] U.S. Cl. ................. 523/400; 525/110; 525/118; 525/119; 525/510; 525/514
[58] Field of Search .............. 525/514, 110, 119, 118, 525/510; 523/400

[56] References Cited

U.S. PATENT DOCUMENTS

| | | |
|---|---|---|
| 2,759,901 | 8/1956 | Greenlee . |
| 3,215,757 | 11/1965 | Scheibli et al. ............. 525/514 |
| 3,247,136 | 4/1966 | Wynstra et al. . |
| 3,951,891 | 4/1976 | Töpfl et al. ................ 525/514 |
| 4,293,457 | 10/1981 | Simon ....................... 525/110 |
| 4,296,005 | 10/1981 | Di Benedetto ............. 525/514 |

OTHER PUBLICATIONS

Lee & Neville, Handbook of Epoxy Resins, McGraw-Hill Book Co., New York, N.Y., 1967, pp. 11-13 to 11-15, 11-17 to 11-19 & 17-21.

*Primary Examiner*—John C. Bleutge
*Assistant Examiner*—Robert E. L. Sellers
*Attorney, Agent, or Firm*—Peter D. McDermott; Roger L. May

[57] ABSTRACT

A novel organic solvent based, thermosetting coating composition comprises novel epoxy ester resin having number average molecular weight ($M_n$) about 900 to about 5000 and being the reaction product of diepoxide, for example bisphenol-A epichlorohydrin epoxy resin, with (i) diphenol, for example bisphenol-A, in chain extension reaction and (ii) fatty acid, for example Soya fatty acid, in chain terminating esterification reaction, which chain extension reaction and esterification reaction occur at least in part substantially simultaneously. Preferably, catalyst is employed for said chain extension and esterification reactions. The coating composition further comprises polyfunctional aminoplast crosslinking agent, for example, hexamethoxymethylmelamine, and polycarboxy functional polymeric catalyst. Also provided in a method of making a humidity and solvent resistant coating on a substrate, adapted to provide corrosion protection to the substrate, for example, to bare sheet metal of an automotive vehicle body, which method comprises applying the novel coating composition of the invention to the substrate, for example, by spraying techniques, and subjecting the applied coating to an elevated temperature for a time sufficient to cure the coating.

30 Claims, No Drawings

THERMOSETTING COATING COMPOSITION COMPRISING POLYMERIC CATALYST

TECHNICAL FIELD

This invention relates to a novel epoxy ester resin and to a novel, solvent-based, thermosetting coating composition comprising same. It relates also to such coating composition formulated, for example, as sprayable, high solids coating composition suitable for use as an automotive vehicle primer to make coatings which are highly resistant to corrosion, humidity and solvents.

BACKGROUND ART

Solvent-based coating compositions are known which employ high molecular weight (e.g. 2,000 to 10,000) polymer resins having crosslinking functionality, and a suitable crosslinking agent. Typically, such coating compositions are applied to a substrate, for example, by spraying, and are then cured by baking the coated substrate at an elevated temperature suitable to drive off the organic solvent and to promote the crosslinking reaction. The resulting thermoset coating, if sufficiently humidity and solvent resistant, can provide aesthetic and functional advantages including corrosion protection for the underlying substrate.

Coating compositions comprising such high molecular weight polymer resins typically comprise only 25% to 50% solids so as to be sprayable or otherwise conveniently applicable to a substrate. The viscosity of coating compositions of higher solids content is typically too high for this purpose. Conventional epoxy ester based automotive vehicle spray primers, for example, typically have a volatile organic content ("VOC") of approximately 623 g/l (5.2 lb./gal).

Elimination of the volatile organic solvent portion during curing of these conventional low-solids coating compositions is relatively large and therefore presents undesirable material handling difficulties, and added expense. Furthermore, excessive solvent losses and/or solvent recovery equipment add considerable expense to the coating operation. Recently, governmental regulations on hydrocarbon emissions, particularly applicable to automotive coating operations, mandate a significant reduction in volatile organic content for coating compositions. Thus, for example, in the United States, governmental guidelines establish certain deadlines by which time emissions of volatile organics from automotive vehicle primer coating operations must be reduced to within certain defined limits. To meet such guidelines, coating compositions of reduced VOC can be employed in conjunction with emissions treatment equipment to achieve the specified emissions limit. Such treatment presents significant additional expense, however, and thus there is a great need for coating compositions of VOC reduced near to, or preferably even lower than the governmental limits, which yet can be applied to a substrate using known spray application techniques.

In response to these concerns, high solids coating compositions have been suggested which, typically, employ a low molecular weight multi-functional adduct or copolymer in combination with a multi-functional crosslinking agent. These high solids coating compositions can be applied by spraying, for example, with lower VOC than would be possible with conventional epoxy ester based coating compositions or other conventional coating compositions comprising high molecular weight polymer resins. After application to the substrate, high solids coating compositions are cured by baking at a cure temperature, that is, at an elevated temperature suitable to drive off the volatile organic content and to promote crosslinking and in some instances polymerization of the multi-functional low molecular weight component(s).

Typically, the physical properties of the coatings provided by such known high solids coating compositions can differ significantly from those of the cured coatings provided by the conventional, low solids coating compositions. In particular, the cured coatings obtained from known high solids coating compositions can be inferior in that they can be less flexible, less solvent resistant, less adherent to the substrate and/or for other reasons provide less corrosion inhibition for the underlying substrates. Accordingly, it would be highly desirable to provide a coating composition comprising low molecular weight materials suitable for use in high solids, solvent based coating compositions and yet which, upon curing, form coatings having physical properties comparable to those obtained from conventional low solids solvent-based coating compositions.

Accordingly, it is an object of the present invention to provide novel low molecular weight resins suitable for use in high solids, solvent-based thermosetting coating compositions. In this regard, it is a particular object of the invention to provide novel low molecular weight epoxy ester resins which are crosslinkable during cure, on the surface of a substrate.

It is another object of the invention to provide novel coating compositions comprising such crosslinkable epoxy ester resins. In this regard, it is a particular object of the invention to provide a novel epoxy ester thermosetting coating composition of sufficiently low VOC to meet governmental guidelines and yet which can be applied to a substrate by spraying or other known method.

It is another object of the invention to provide a method of making a coating on a substrate, which coating has advantageous physical properties including, for example, humidity and solvent resistance and corrosion protection for the underlying substrate. Additional aspects and advantages of the invention will be apparent from the following description thereof.

DISCLOSURE OF THE INVENTION

According to the present invention, a novel organic solvent based thermosetting coating composition comprises A. epoxy ester resin of number average molecular weight ($M_n$) about 900 to about 5000, being the reaction product of diepoxide with (i) diphenol in chain extension reaction and (ii) fatty acid in chain terminating esterification reaction, which chain extension reaction and esterification reaction occur substantially simultaneously at a reaction temperature reaching at least about 175° C., wherein the epoxy functionality, phenol functionality and carboxyl functionality are employed in relative proportions of about 1:0.4–1:0.4–1 equivalents, respectively;

B. polyfunctional aminoplast crosslinking agent; and

C. polycarboxy functional polymeric catalyst of number average molecular weight ($M_n$) about 1,000–10,000 being substantially unreactive at room temperature with the epoxy ester resin and the polyfunctional aminoplast crosslinking agent, in an amount of about 2% to about 15% by weight of resin solids in the coating composition.

Particularly preferred compositions of the invention are those formulated as high solids coating compositions adapted to be applied by spraying onto a substrate. Such compositions are especially useful as a primer coat on the bare, unpolished metal surface of an automotive vehicle body. As used herein, a high-solids coating composition is one in which a volatile organic content of about 400 g/l (3.4 lb./gal.) or less yields a viscosity of less than approximately 35 sec. #4 Ford Cup at 27° C. (80° F.).

According to another aspect of the invention, a method of making a corrosion, solvent and humidity resistant coating on a substrate comprises applying to the substrate the novel, solvent based, thermosetting coating composition of the invention and subsequently subjecting the coating to an elevated temperature for a time period sufficient to substantially cure the coating layer. Typically, the novel coating compositions of the invention can be cured by heating to between about 100° C. (212° F.) and about 230° C. (445° F.), for a time period sufficient to yield a cured coating, for example for about 15 to about 60 minutes. According to preferred embodiments of the invention, the coating composition can be sufficiently cured for good coating properties by heating to about 120° C. (250° F.) for about 15 minutes but, in addition, such preferred composition will tolerate curing at up to about 200° C. (392° F.) for as much as about 60 minutes without substantial lose of such advantageous coating properties.

The coating compositions of the present invention have been found especially advantageous for use as high solids primer compositions suitable to be applied by spraying techniques. More specifically, high solids coating compositions according to the invention, formulated, for example, at VOC as low as about 350 g/l (2.9 lb./gal.) to about 465 g/l (3.9 lb./gal.) are found to have viscosity as low as about 15 to about 45 sec. #4 Ford Cup and so are well suited to spray application techniques at, for example, about 27° C. High solids coating compositions according to preferred embodiments are found to have viscosity as low as about 15 sec. to about 25 sec., #4 Ford Cup at VOC of about 410 g/l to about 430 g/l (3.4 to 3.6 lb./gal.). Accordingly, the coating compositions of the invention provide ease of material handling and less expense than previously known coating compositions which were sprayable only at higher VOC. Furthermore, the coating compositions of the invention can be used to meet or exceed governmental guidelines regarding hydrocarbon emissions with a reduction or elimination of emissions treatment and emissions treatment equipment. In addition, reduction in the amount of hydrocarbon solvent used in the coating composition provides direct cost advantage.

Unlike various previously suggested high solids coating compositions, the coating compositions of the present invention provide the above-mentioned low VOC and cure-response advantages without sacrifice of advantageous physical properties in the cured coating. On the contrary, when applied, for example, over a metallic substrate, such as when applied as an automotive vehicle primer coat over bare sheet steel, cured coatings according to the invention have been found to provide excellent adhesion to the substrate, excellent humidity resistance, and excellent corrosion resistance in comparison to other commercially available high solids coating compositions of similar nature.

Other features and advantages of this invention will become more apparent from the succeeding, detailed description thereof including the preferred embodiments and best mode of carrying out this invention.

DETAILED DESCRIPTION OF THE INVENTION

The epoxy ester resin employed in the coating composition of the invention is the reaction product of a diepoxide with (i) diphenol and (ii) fatty acid, such as Soya fatty acid. It is a significant characterizing aspect of the invention that the chain-extension reaction of the diepoxide with the diphenol is carried out substantially simultaneously with the chain-termination esterification reaction of the diepoxide with the fatty acid. While not wishing to be bound by theory, it is presently understood that the esterification reaction of the carboxyl functionality of the fatty acid with the epoxy functionality of the diepoxide proceeds at approximately the same or similar rate as the chain extension reaction of the phenolic hydroxy functionality of the diphenol with the epoxy functionality, given the reaction conditions of the invention as specified herein. Carrying out these reactions simultaneously produces a resin comprising a variety of different molecular structures, not merely a series of analogs of the same structure. In addition, simultaneous reaction appears to yield a product epoxy ester resin of wide molecular weight distribution such as, for example, from about 600 or less to about 12,000 or more. A significant advantage of the invention which is presently understood to stem, in part, from the simultaneous reaction, and particularly from the wide molecular weight distribution of the epoxy ester resin product, is the surprisingly low viscosity of the coating compositions comprising these resins. More specifically, the coating compositions of the invention are found to have a significantly lower viscosity at a given solids content (by weight) than many comparable, commercially available high solids coating compositions. Accordingly, the coating composition of the invention can be sprayed at significantly higher solids content and, thus, require significantly lower VOC.

It is seen to be another consequence of the wide molecular weight distribution of the epoxy ester resin that the glass transition temperature (Tg) of the novel epoxy ester resin of the invention is advantageously low. More accurately, it is presently understood that the lower molecular weight fraction of the epoxy ester resin and any unreacted monomer act in the nature of a plasticer for the resin to effectively provide a lower apparent Tg. In any event, it is significant that the low Tg is achieved notwithstanding the high aromatic content of the resin. A low Tg is well known to provide an improved, smoother surface on the cured coating since, during heating to cure the coating, after it reaches its Tg and before it substantially cures at its cure temperature, the coating can flow and become smooth. Thus, the lower Tg provides a longer time period during which the coating can flow and become smooth and thus improve the surface quality of the cured coating. In addition, the wide molecular weight distribution of the epoxy ester resin components is believed to contribute, in part, to the advantageous flexibility of the cured coating of the invention. This coating flexibility is unexpected in view of the high weight percent of aromatic units in the epoxy ester resin. Such high flexibility in conjunction with high aromatic content is especially advantageous in view of the very significant cost advantage of aromatic over aliphatic feedstocks.

Further, it is now believed that aromatics in a coating composition, such as a primer composition for a metal substrate, are more resistant to hydrolysis than are aliphatics. Accordingly, while again not wishing to be bound by theory, it is presently believed that the high aromatic content of the epoxy ester resin of the invention explains in part the exceptional corrosion protection found to be provided by the novel coatings of the present invention. This is especially the case, for example, according to preferred embodiments of the epoxy ester resin, wherein the diepoxide reactant as well as the diphenol provides aromatic units to the resin. In addition, it is presently understood that the phenolic oxygens introduced into the epoxy ester resin by the chain extension reaction of phenol with epoxy, advantageously provide excellent adhesion to metal substrate, for example steel substrate. Thus, the high aromatic content of the cured coating and its excellent adhesion each enhances the advantage provided by the other to yield the above-mentioned exceptional corrosion protection of the cured coatings of the invention.

The diepoxide reactant suitable for the epoxy ester resin can be any of numerous diepoxides including many which are commercially available and which will be apparent to the skilled of the art in view of the present disclosure. While, ultimately, the choice of reactants for preparing the epoxy-ester resin will depend to an extent upon the particular application intended for the coating composition, terminal diepoxides, that is diepoxides bearing two terminal epoxide groups, are generally most preferred. These are generally more reactive and therefore require reaction conditions under which undesirable side reactions, for example, epoxy-epoxy reactions and gellation, can be more easily avoided. Preferably, the diepoxide has a number average molecular weight ($M_n$) between about 100 and about 1000, and more preferably between about 100 and about 600. Numerous such preferred diepoxides are readily commercially available, for example, bisphenol-A epichlorohydrin epoxy resin, for example, the Epon (trademark) series, Shell Chemical Company, Houston, Tex., and the DER (trademark) series, Dow Chemical Company, Midland, Mich. Also preferred are cycloaliphatic diepoxy resins, for example, the Eponex (trademark) series, Shell Chemical Company, Houston, Tex., hydantoin epoxy resins such as, for example, Resin XB2793 (trademark), Ciba-Geigy Corporation, Ardsley, N.Y., and any of a wide variety of acyclic or cyclic aliphatic diepoxides such as, for example, 1,4-butanediol diglycidyl ether and 4-vinylcyclohexene dioxide and the like. Among those listed, diglycidyl ether bisphenol-A resins or higher molecular weight analogs thereof, are most preferred in view of their cost and commercial availability, for example, Epon 828 (trademark) and Epon 829 (trademark), of the Epon (trademark) series mentioned above. The higher molecular weight members of the Epon (trademark) series are suitable for use where higher molecular weight epoxy ester resins are desired. Generally, however, such higher molecular weight resins provide coating compositions of somewhat higher viscosity (or lower solids content). Additionally, it should be recognized that the higher molecular weight members of the Epon series, for example Epon 1001 and Epon 1004, may be somewhat less preferred, since these bear hydroxyl functionality which may undergo undesirable side reactions with, for example, epoxy functionality. The result can be undesirable resin properties and gellation. Other suitable diepoxides for use in synthesizing the epoxy-ester resin of the invention are commercially available and will be apparent to the skilled of the art in view of the present disclosure. Also, it will be understood from the foregoing that any mixture of compatible diepoxides may be used.

In addition to the diepoxide, a portion of the epoxy functionality can be provided by any compatible monoepoxy compound or, more suitably, polyepoxy compound or mixture of compounds having three or more epoxy groups per molecule. Suitable such polyepoxides include, for example, those of molecular weight about 200 to about 800. The polyepoxide can be essentially any of the well known types such as polygylcidyl ethers of polyphenols. These can be produced by etherification of a polyphenol with epihalohydrin in the presence of alkali. It will be recognized by the skilled of the art in view of the present disclosure, that in some instances, particularly where a coating composition of high solids content is less important, it may be desirable to employ polyepoxides having higher molecular weights. Preferably, any such polyepoxide contains free hydroxyl groups in addition to epoxide groups.

While polyglycidyl ethers of polyphenols can be employed, it is frequently desirable in such compositions to react a portion of the reactive sites (hydroxyl or in some instances epoxy) with a modifying material to vary the film characteristics of the resin. The epoxy resin may be modified, for example, with isocyanate group containing organic materials or other reactive organic materials.

Another quite useful class of polyepoxides are the novolak resins including, for example, the novalak epoxy resins ECN 1235 (trademark) and ECN 1273 (trademark), Ciba-Geigy Corporation.

According to preferred embodiments of the present invention, epoxide compounds other than diepoxide compounds provide no more than about 15% and most preferably substantially none of the total epoxide functionality in the reactants used to form the epoxy-ester resin.

The diphenol reactant suitable for the epoxy ester resin of the present invention includes numerous commercially available materials, many of which will be readily apparent to the skilled of the art in view of the present disclosure. Preferred diphenols have the general formula (I):

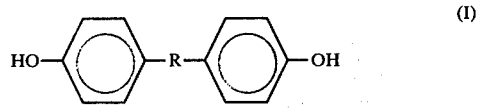

(I)

wherein R is a divalent linking moiety substantially unreactive with the diepoxide resin. Preferably R is a divalent, organic, linking moiety, for example, $(CH_2)_n$ where n is preferably from about 1 to about 8, C=O, and the like, although inorganic moieties, for example sulfonyl and the like, are also suitable. Diphenols of this character have been found to provide good reactivity with the preferred diepoxides described above and to provide, ultimately, cured coatings of the invention having excellent physical properties, most notably excellent corrosion protection. It will be apparent to the skilled of the art in view of the present disclosure that R should be substantially unreactive with the fatty acid employed for the epoxy ester resin. Particularly preferred diphenols include those according to formula (I) above, wherein R is selected from the group comprising a straight or branched alkylene or alkylidene moiety of one to about 10 carbons, preferably having three to four carbons and most preferably having the general formula

wherein R' and R" are the same or different and each is a monovalent organic moiety preferably selected from the group comprising hydrogen and lower alkyl, of about one to four carbons, most preferably one or two carbons, and the like or a mixture of any of them. Preferably the diphenol has a number average molecular weight ($M_n$) between about 180 and about 500, more preferably between about 180 and about 250. Diphenols within this range, employed with the preferred diepoxides described above, and suitable fatty acid are found to provide epoxy ester resins comprising mixed reaction products of particularly wide molecular weight distribution, which resins (as discussed above) are found to provide coating compositions of the invention having especially advantageous physical properties including low Tg and good corrosion protection. Such diphenols include, for example bisphenol-A, which is most preferred, bisphenol-B and the like and a compatible mixture of any of them. As used herein the term diphenol may include, for example, compounds comprising a single dihydroxy substituted phenyl ring such as benzenediol. More preferred, however, are those diphenols providing two terminal, mono-hydroxy substituted phenyl rings such as in formula (I), above. Other examples of diphenols are bis-(4-hydroxy-tert-butylphenyl)-2,2-propane, bis-(2-hydroxy-naphthyl)-methane and 1,5-dihydroxynaphthalene. Other suitable diphenols for the epoxy ester resin of the present invention will be apparent to the skilled of the art in view of the present disclosure.

The fatty acid employed as a chain terminating esterification reactant for the epoxy ester resin of the present invention includes numerous commercially available materials. Suitable fatty acids include those derived from or contained in either animal or vegetable fat or oil. Preferred are fatty acids of from about 8 to about 18 carbons. Also preferred among the fatty acids are the more saturated fatty acids, since it appears that olefinic unsaturation in the fatty acid can undergo a polymerization-type reaction between such double bonds during the synthesis of the epoxy ester resin of the invention. Unsaturated fatty acids are suitable for use, however, such as, for example, oleic acid, linoleic, linolinic or the like and mixtures of those acids, and can be used together with a suitable inhibitor for the polymerization-type reaction such as hydroquinone or the like, of which many are commercially available and will be apparent to the skilled of the art in view of the present disclosure. In addition, aromatic fatty acids are commercially available and can be employed. The aliphatic fatty acids are preferred, however, in view of the enhanced coating flexibility they provide. Especially preferred for use are the substantially saturated fatty acids such as Soya fatty acid which is most preferred, and butyric, lauric, palmitic and stearic fatty acids and the like or a mixture of any of them. These are relatively inexpensive and have been found to provide good reactivity with the preferred diepoxides described above. For convenience of use, the fatty acids which are semi-solid or liquid at room temperature are generally preferred over the solid fatty acids.

The epoxy ester resin of the invention can be made according to reaction conditions now specified, employing techniques which are well known and which will be readily apparent to the skilled of the art in view of the present disclosure. The chain extension and chain termination reactions occur substantially simultaneously by charging the diepoxide, the diphenol and the fatty acid in a suitable reactor and heating the mixture. It should be recognized that to assure rapid and/or more complete reaction of the diepoxide with the carboxyl and phenol functionalities, and to assure that these reactions occur substantially simultaneously, that is, that they proceed substantially concurrently at approximately the same or similar rates, it is usually preferred to have a catalyst present. Alternatively, other techniques, for example, higher reaction temperatures and longer reaction times, or relatively greater proportions of diphenol (which, absent catalyst, is believed to be somewhat less reactive than is fatty acid with diepoxide), can be used to provide substantially simultaneous reactions. The use of catalyst, however, has been found to provide advantageous epoxy ester resin of the invention and is preferred. Epon 829 (trademark), mentioned above, as sold, provides a proprietary catalyst. Epon 828 (trademark), is substantially the same but does not provide such catalyst. Suitable catalysts are commercially available and include, any of the well known catalysts for epoxy-carboxylic/epoxy-phenol reactions such as, for example, sodium carbonate which is preferred, and lithium neodecanoate, lithium naphthenate, lithium nanoate, other known organometallic catalysts and tertiary amine catalysts and the like or a compatible mixture of any of them. Others will be apparent to the skilled of the art in view of the present disclosure. The reaction mixture is heated to at least about 175° C. (345° F.), when, in the presence of catalyst, exothermic reaction normally will proceed with or without further heating. Typically, the reaction mixture will then reach about 195°–205° C. (380°–400° F.), depending, in part, upon the batch size and reactor vessel insulation, etc. In the absence of catalyst, such exotherm typically is not observed and continued heating is required. The progress of the reaction can be followed by measuring acid number. After the acid number measurements have indicated the reaction is sufficiently completed, preferably at acid number 6 or less, the resin may be diluted with suitable solvent in order to reduce the viscosity to a desirable level. A non-volatile level of 80% has been found to be suitable for storage of the coating composition.

Since, in the preferred embodiments described above, the chain extension reaction of the epoxide functionality with the phenol functionality proceeds at approximately the same rate as the chain termination reaction of the epoxide functionality with the carboxylic functionality, and since these two reactions are carried out simultaneously to yield the epoxy ester resin, it should be recognized that the relative proportions of the reactants in the reaction mixture can significantly effect the properties of the product resin. Accordingly, it has been found that the reactants are preferably present in amounts which provide the reactive functionality in the relative proportions of one equivalent of epoxy functionality to about 0.4 to about one equivalent of phenol functionality to about 0.4 to about one equivalent of carboxyl functionality. More preferred relative proportions are one equivalent of epoxy functionality to about 0.5–0.7 equivalent of phenol functionality to about 0.5–0.7 equivalent of carboxyl functionality. Most preferably diepoxide, diphenol and fatty acid are present in relative amounts to provide approximately 1:0.7:0.6 equivalents of functionality, respectively. Epoxy ester resins provided according to these preferred ranges of reactant amounts have been found to provide coating compositions having exceptional physical properties, most especially corrosion protection such as, for example, when (spray) applied to a metal substrate such as, for example, bare, unpolished automotive vehicle body sheet steel. In the absence of catalyst for the epoxy/phenol and epoxy/carboxy reactions, it is generally preferred to use a relatively greater portion of diphenol within the ranges specified above. Some unreacted diphenol can be tolerated in the reaction product.

While not wishing to be bound by theory, the exceptional corrosion inhibition and other physical properties provided by the coating compositions of the invention are presently believed to stem in large part from a novel chemistry not previously known or suggested. More specifically, it appears that the epoxy ester resins of the invention may comprise, in substantial part, phenol terminated constituents. That is, whereas previously known epoxy adducts suggested for use in coating compositions are reported to be terminated by epoxy groups which have been esterified, it now appears that the epoxy ester resins of the present invention are, in substantial part, phenol terminated. This phenomenon is presently understood to be a consequence of the simultaneous reaction of both diphenol and fatty acid with the diepoxide and the relative proportions of reactants according to the invention, as specified above. The carboxy functionality competes with the phenol functionality for reaction with the epoxy functionality. Consequently, (notwithstanding the excess of epoxy relative to phenol in the preferred embodiments described above) reaction products bearing terminal phenol are present upon exhaustion of unreacted epoxy functionality. It would have been expected that the carboxyl functionality of the fatty acid would react in major part with the pendent hydroxy groups of the chain extended epoxy-phenol adducts. However, such reaction would, of course, produce a water molecule. Yet, upon distillation of the epoxy ester resin reaction product, little more water is found than would be contributed as impurity in the reactants. This phenomenon is illustrated in Example XVII. Accordingly, while a portion of the fatty acid may react with the pendent hydroxy groups, it seems clear that a far larger portion than would be expected reacts with epoxy (in competition with the phenol functionality) such that the reaction product, i.e. the epoxy ester resin of the invention, is, in substantial part, phenol terminated. One most significant advantage believed to stem, in part, from this novel chemistry is the excellent cure response of the coating compositions of the invention. The terminal phenol moiety is believed to provide exceptionally high reactivity with polyfunctional aminoplast crosslinking agent at elevated (cure) temperatures.

The above described epoxy ester resin is employed together with polyfunctional aminoplast crosslinking agent. Included within the crosslinking agents suitable for use in the coating composition are numerous materials which are well known to the skilled of the art including, for example, alkylated melamine formaldehyde resins with one to about eight carbon atoms in the alkyl group. Other suitable crosslinking agents will be apparent to the skilled of the art in view of the present disclosure. Many such crosslinking agents are readily commercially available including, for example, the Resimene (trademark) series, Monsanto Company, St. Louis, Mo., the most preferred being Resimene 717 (trademark), described as a low temperature cure methylated melamine-formaldehyde resin.

In addition, suitable polyfunctional aminoplast crosslinking agents can be prepared employing conventional techniques. Accordingly, for example, a lower alkanol such as methanol, ethanol, butanol, isobutanol, isopropanol, hexanol, 2-ethylhexanol or the like or a mixture of any of them is reacted with a melamine formaldehyde. Preferred crosslinking agents of this type include butylated melamine formaldehyde resin, methylated/butylated formaldehyde resin and polyalkyl ethers of polymethylol melamines and the like, of which hexamethoxymethyl melamine resin is most preferred in view of its relatively lower cost, ready commercial availability, its low reactivity with the epoxy ester resin of the invention at normal storage temperatures and its high reactivity at elevated cure temperatures. In this regard, preferred polyfunctional aminoplast crosslinking agent is substantially unreactive with the epoxy ester resin at or below about 60° C. Other suitable melamine crosslinking agents will be apparent to the skilled of the art in view of the present disclosure.

The proper proportion of polyfunctional aminoplast crosslinking agent to epoxy ester resin will depend, in part, upon the properties desired in the coating to be produced and, in part, upon the desired cure response of the coating composition (which will depend, in turn, upon the baking schedule intended for curing the coating composition) and, in part, upon the desired storage stability of the coating composition, that is, upon the desired shelf life. Accordingly, the amounts of epoxy ester resin that can be blended with the crosslinker to form coating compositions of the invention may be varied considerably. Preferably, the crosslinking agent is used in amounts of about 5% to about 40% by weight of the total resin solids, more preferably about 20% to about 30%.

The use of polycarboxy functional polymeric catalyst as a component of the coating composition of the invention is a novel and significantly advantageous aspect of the present invention. It can be made according to conventional polymerization processes well known to the skilled of the art, such as batch polymerization. Accordingly, the polymeric catalyst can be made, for example, by conventional techniques in which the monomers, solvents and polymerization initiators are charged into a reaction vessel and heated to a polymerization temperature for sufficient time to form the copolymer. Preferably, the monomers and a polymerization initiator, for example t-butyl perbenzoate, are first mixed together, optionally with a small quantity of solvent, and then added slowly, for example over several hours, to refluxing solvent containing additional polymerization initiator. The polymerization initiator in the refluxing solvent can be one different from but compatible with the initiator mixed with the monomers, for example, cumene hydroperoxide. Other suitable polymerization initiators are well known and will be apparent to the skilled of the art in view of the present disclosure. Preferably the polymeric catalyst is stored in lined drums, since it has been found to be somewhat incompatible with steel.

The polymeric catalyst may comprise any suitable polycarboxy functional material which is compatible with the other components of the coating composition. In general, the polymeric catalyst can be any polycarboxy functional compound or mixture of compounds substantially unreactive with the epoxy ester resin and the polyfunctional aminoplast crosslinking agent, at storage conditions, (that is, typically, at room temperature). Preferably, the polymeric catalyst has a number average molecular weight ($M_n$) about 1,000–10,000, more preferably about 1,500 to about 3,000. While use of polymeric catalyst of higher number average molecular weight, for example, about 10,000, is found to produce coating compositions of somewhat higher viscosity, when used in suitable amounts, for example about 2–5% by weight of epoxy ester resin, it is possible to employ same to prepare high solids coating compositions. According to preferred embodiments, the polymeric catalyst comprises the polymerization reaction product of (i) suitable ethylenically unsaturated carboxylic acid, that is, carboxylic acid providing a double bond for polymerization such as, for example, acrylic acid, methacrylic acid, which two are preferred, butanoic acid and the like or a compatible mixture of any of them, with (ii) any suitable ethylenically unsaturated copolymerization monomer providing a double bond for polymerization and which provides to the polymerization reaction product no functionality substantially reactive with the epoxy ester resin or the polyfunctional crosslinking agent of the coating composition at storage temperature. According to such preferred embodiments, the polycarboxy functionality is introduced into the polymer as pendant groups on the polymer backbone by copolymerizing the carboxylic acid with the copolymerization monomer.

Suitable copolymerization monomers include, for example, alkyl acrylates and alkyl methacrylates having 1 to about 8 carbons, preferably about 1–4 carbons, in the alkyl group. Typical alkyl acrylates that can be used to prepare the polymeric catalyst are methyl acrylate, ethyl acrylate, propyl acrylate including, for example, isopropyl acrylate, any butyl acrylate, hexyl acrylate, 2-methylpentyl acrylate, octyl acrylate and the like or a mixture of any of them. Generally preferred are butyl acrylate, butyl methacrylate or a mixture of them. Preferred copolymerization monomers include butyl methacrylate, which is generally most preferred, glycidyl acrylate, glycidyl methacrylate, styrene, any suitable vinyl ethers, and the like or a compatible mixture of any of them. Suitable carboxylic acids and copolymerization monomers in addition to those recited above are commercially available and will be apparent to the skilled of the art in view of the present disclosure.

According to certain preferred embodiments of the invention, the polymeric catalyst is the reaction product of about 55% to about 80% by weight, preferably about 70% by weight copolymerization monomers with about 20% to about 45%, preferably about 30% by weight carboxylic acid monomers.

One preferred polymeric catalyst according to the invention consists of the polymerization product of about 30% by weight acrylic acid with about 70% by weight butyl methacrylate. The polymerization reaction is preferably carried out in the presence of initiator such as t-butyl perbenzoate and cumene hydroperoxide or the like. A suitable procedure for making this and other polymeric catalyst of the invention is detailed in the Examples, below.

The amount of polymeric catalyst used in the coating composition of the invention depends, in part, upon the desired cure response and, in part, upon the physical properties desired in the cured coating. Sufficient polymeric catalyst is used to provide significant improvement in the physical properties of the cured coating while maintaining the coating composition sufficiently storage-stable for its intended use. It should be noted, however, as further discussed below, that it is a significant advantage of the present invention that the coating compositions are far more storage-stable with the polymeric catalyst than are like compositions containing an equivalent amount of known, non-polymeric catalyst. It should be noted, in addition that the coating compositions of the invention can employ a portion, preferably a minor portion, if any, of the known, non-polymeric catalysts in conjunction with the above-described polymeric catalyst. Such non-polymeric catalysts known to the skilled of the art to catalyse the aminoplast crosslinking reaction include, for example, p-toluenesulfonic acid, phosphoric acid, phenyl acid phosphate, butyl phosphate, butyl maleate, and the like or a compatible mixture of any of them. These catalys are known to be most useful for coating compositions intended for low temperatures curing schedules and/or when highly etherified melamine resins are used such as hexa(methoxymethyl)melamine or the like and are used in amounts which depend, in part, upon the intended baking (curing) schedule. (Typically, amounts of about 0.2% to about 3.0% by weight of total resin solids are used.) In the present invention, it is most preferred that the polycarboxy functional acrylic copolymer cataysts be used without additional such non-polymeric catalyst.

While it will be within the skill of the art in view of the present disclosure to determine the most suitable amount of polymeric catalyst to be used in a coating composition of the invention intended for a given use, it typically will be preferred to use sufficient polymeric catalyst to raise the acid level of the epoxy ester resin as high as about 50, more preferably about 15 to about 35. Generally preferred is use of polymeric catalyst in amounts of about 2–10% by weight of resin solids in the coating composition. In the preferred embodiment of the coating composition of the present invention, about 5–10% polymeric catalyst has been found to be more preferred, and about 8% most preferred. Although up to 15% or more can be usefully employed, such amounts may not provide the full advantage of storage stability provided by use of more preferred amounts. The polymeric catalyst can be added to the epoxy ester resin by any known mixing method. Preferably, however, it is "hot blended", that is, it is mixed with the epoxy ester resin at elevated temperature, for example at or above about 105° C. (220° F.). Mixing at room temperature produces a somewhat cloudy coating composition, while, surprisingly, mixing at elevated temperature is found to produce a clear coating composition. The hot blended clear coating composition has unexpectedly been found to provide a cured coating of higher gloss than the cold blended cloudy composition. Of course, where higher gloss is not desirable, it may be preferred to cold blend the resin and catalyst to avoid the added time and expense of heating same.

As noted above, the polymeric catalyst component of the present invention is a significantly advantageous aspect of the present invention. More specifically, it has been found to increase the storage stability of the epoxy ester resin coating compositions over that of like resin coating compositions employing known non-polymeric catalyst. Thus, for example, coating compositions according to preferred embodiments of the invention can be subjected to about 60° C. for periods of about 24 hours with only small increase in viscosity, for example, an increase of less than about 5 sec., #4 Ford Cup at 27° C. And even when subjected to temperatures of about 60° C. for periods of about 120 hours, preferred embodiments of the coating composition are found to increse in viscosity less than about 10 sec., #4 Ford Cup at 27° C.

Surprisingly, in addition to improved storage-stability, the coating composition of the invention comprising polycarboxy functional polymeric catalyst can be cured at advantageously low temperatures. Thus, coating compositions of the invention can be cured within about 15–30 minutes at temperatures as low as about 135° C.–165° C. and yet yield substantially optimal properties. In fact, even when the coating composition of the present invention is cured at such lower temperatures, the physical properties of the coating are improved over those achieved at higher cure temperatures by some previously known high solids coating compositions employing known, non-polymeric catalysts. Specifically, for example, the present invention, especially according to preferred embodiments, provides excellent humidity resistance, corrosion resistance, hardness, gloss and acid resistance. These advantages are illustrated in the Examples below. Typically, it is most preferred to cure at about 150° C. for about 20 minutes.

In addition to both improved storage stability and the ability to cure at reduced temperature, the coating compositions of the invention have been found to be able to provide a cured coating of advantageous physical properties when cured at any of a wide range of cure temperatures. More specifically, while, as noted above, the coating compositions according to preferred embodiments of the invention have been found to cure at advantageously low temperatures within short curing periods, yet, in addition, according to another highly advantageous aspect of the invention, the coating compositions can be cured without significant loss of advantageous physical properties at temperatures as high as about 195° C. (380° F.) or more for periods up to about 60 minutes or more. Considered together with the storage stability of the coating composition, it can be readily recognized that the present invention provides a highly significant advance in the coating composition art. More specifically, it can be seen that great flexibility is provided by the coating compositions of the invention in both designing and implementing a curing schedule for the coating composition.

It will be within the skill of the art to determine the proper volatile organic content for a given coating composition of the invention and for a given application. Preferred solvents have relatively low volatility at temperatures appreciably below their boiling points such that solvent evaporation is low during storage and/or application of the coating composition to the substrate. A suitable solvent system may include, for example, toluene, methyl ethyl ketone, isobutyl acetate, xylene, cellosolve acetate, acetone and a mixture of any of them. Other solvents which may be employed include terpenes, aliphatic and aromatic naphthas, and the like. Additional suitable solvents are commercially available and will be apparent to the skilled of the art in view of the present disclosure. Generally it is preferred to employ a portion of C-4 to C-8 alcohol solvents such as, for example, butanol, pentanol, hexanol, and the like or a mixture of any of them since these inhibit the crosslinking reaction of the polyfunctional aminoplast resin with the epoxy ester resin at room temperature and thereby improve storage stability. At elevated temperature during cure, the alcohol solvent evaporates and, hence, ceases to inhibit the crosslinking reaction. Preferred solvents also may include, for example, methyl amyl ketone and the like, or a mixture thereof with C-4 to C-8 alcohol such as, for example, a 1:2 mixture by weight of butanol and methyl amyl ketone, respectively which is most preferred.

Any solvent allowed to remain in the cured coating should be inert so as to avoid adverse effect upon the cured coating or upon another coating layer used in conjunction with it during the curing process or thereafter. Preferrably, the cured coating is substantially free of solvent.

Sufficient solvent is used to reduce the viscosity of the coating composition to a level suitable for storage or for application to the substrate in the desired manner. While conventional epoxy ester automotive spray-applied primer coating compositions are known toi require a volatile organic content of about 540 g/l, comparable coating compositions of the present invention require as little as 430 g/l or less VOC to provide a viscosity of 18 sec., #4 Ford Cup, which is suitable for spray application techniques. It is generally preferred that sufficient solvent be used to provide a viscosity of about 18 to about 22 seconds, #4 Ford Cup at 27° C. (80° F.) for a coating composition which is to be sprayed onto a substrate. Of course, the coating compositions of the invention need not be formulated as a "high solids" composition. Rather, it can have a higher VOC to provide a lower viscosity. Similarly, the coating compositions of the invention need not be formulated as a sprayable composition. Rather, it can have an even higher solids content and viscosity.

In addition to the epoxy ester resin, polyfunctional aminoplast crosslinking agent and polycarboxy functional catalyst, other components can be used, such as flow control agent(s), for example, polybutyl acrylate; wetting agent(s), for example, silicone; pigments; pigment dispersants; corrosion inhibitors, for example, chromate pigments, numerous of all of which are known to the skilled of the art. In addition, suitable reactive additives can be used, including, for example, low molecular weight diol flow control agents and reactive diluents.

According to another aspect of the invention, a coating on a substrate is provided, which coating comprises the crosslinked polymer product following cure of a coating composition of the invention. The coating composition can be a low solids composition, that is, it can have a high VOC, but generally a high solids composition, that is, one having a low VOC is preferred for the reasons given above. It can be applied by any conventional method, including brushing, dipping, flow coating, spraying, etc. Spraying will generally be preferred, for example, for applying the compositions as an automotive primer. For the reasons discussed above, the novel epoxy ester resins of the invention are especially advantageous for formulating high solids coating compositions. For this purpose, the epoxy ester resin of the invention preferably has a number average molecular weight ($M_n$) of about 900 to about 2000. In this regard, coating compositions of the invention employing preferred epoxy ester resin, preferred crosslinking agent and preferred polymeric catalyst, as described above, are suitable to be applied to a substrate by spraying even though formulated at volatile organic content levels as low as about 350–465 g/l (2.9–3.9 lb./gal.), a more preferred range being about 395–470 g/l (3.3–3.9 lb./gal).

Curing the coating composition requires baking for sufficient time at sufficiently elevated temperature to react the crosslinking agent with the epoxy ester resins. The time and temperature required to cure the coating are interrelated and depend upon the particular epoxy ester resin, crosslinking agent, polymeric catalyst, solvent and other materials, if any, and the amount of each comprising the coating composition. Employing a volatile organic content of about 430 g/l (3.6 lb./gal.) and selecting preferred components as described above, the bake time and temperature is typically about 15 to about 30 minutes and about 135° C.–165° C. (275° F.–325° F.), respectively. The coating compositions according to preferred embodiments of the invention, as described above, have been found to provide the best coating results when cured at temperature at about 150° C. (300° F.) for 20 minutes. It is a highly significant advantage of the invention, however, that these same coating compositions can withstand, for example, temperature as high as about 200° C. (390° F.) for periods of time as long as about 60 minutes. Thus, as noted above, great flexibility is provided in both designing and implementing a curing schedule for parts coated with the coating compositions of the invention. Thus, in the assembly of automotive vehicles, for example, vehicles unavoidably held in a curing oven for long periods of time during unplanned assembly line shut-downs are recovered with cured and unharmed coatings.

High solids coating compositions according to the present invention, comprising the preferred epoxy ester resins described above, melamine crosslinking agent, for example, hexamethoxymethyl melamine, and preferred polymeric catalyst have been found to afford cured coatings with corrosion resistance comparable to conventional epoxy ester based, low solids sprayablecoating compositions. The significant reduction in volatile organic content presents, therefore, a highly advantageous advance in the art.

A most preferred use of the coating composition of the invention is as a high solids sprayable primer for use on a bare metal substrate such as a household or industrial applicance housing or an automotive vehicle body. Primer compositions typically are pigmented and any pigments commonly included in primer compositions for metal substrates and acrylic dispersion topcoats such as, for example, carbon black, iron oxide, lithopone, magnesium, silicate, silica, barium sulfate, $TiO_2$, chrome yellow, calcium chromate, strontium chromate, zinc potassium chromate any the like may be used. The primer can be pigmented according to known methods including, for example, by grinding pigments in a portion of the curable resin and adding to the primer composition.

The pigment-to-binder ratio of the primer may be as much as 4:1 by weight, respectively, depending, in part, upon the condition of the metal substrate. It is preferred, however, to use a primer having a pigment-to-binder ratio of about 1:1–2:1 by weight, respectively.

No special expedients are necessary in formulating the primer compositions of this invention, For example, they may be prepared simply by incorporating the resinous components in a suitable solvent system. Thus, for example, by suitable mixing or agitation, each resinous component may be dissolved in a solvent and the resulting solutions combined to form finished primer compositions.

The solvent system may be any suitable combination of organic solvents as described above. For a high solids, sprayable, automotive vehicle primer, the solvent will comprise preferably about 25 to about 35 percent by weight of the total coating compositions, although of course, larger or smaller amounts may be utilized depending upon the solids content desired. For example, it may be desirable to formulate the primer with a relatively high solids content and then reduce it to spraying consistency prior to the time of application.

The metal substrate can be, for example, aluminum, steel, or phosphated cold-rolled steel. However, any metal used as a construction material is usable. The primer composition may be coated onto the metal base in any conventional manner such as roll coating, brushing, curtain coating, etc. The preferred method of applying the primer composition to the metal is by spraying. The primer is cured at elevated temperatures by any convenient means such as baking ovens or banks of infra-red heat lamps. Suitable curing temperatures are discussed above.

The primer is generally thinned to from about 60 to about 70 percent solids content for spraying purposes with conventional thinners such as aromatic hydrocarbons, commercial petroleum cuts which are essentially aromatic, and the like; and sprayed on to the metal base and cured. The primer is cured at elevated temperatures by any convenient means such as baking ovens or banks of infra-red heat pumps. Suitable curing temperatures are as described above.

The invention will be further understood by referring to the following detailed examples. It should be understood that the specific examples are presented by way of illustration and not by way of limitation. Unless otherwise specified, all references to "parts" are intended to mean parts by weight.

EXAMPLE I

This example illustrates the preparation of an epoxy ester resin for use in a coating composition according to the present invention. In a suitable reactor were charged 1248 parts of Epon 829 (trademark) Shell Chemical Company (diglycidyl ether of bisphenol-A), 530 parts of bishpenol-A and 1186 parts of Soya fatty acid. The temperature of the mixture was brought up to about 177° C. (350° F.) at which point an exothermic reaction took place that raised the temperature up to about 193° C. (380° F.). After 30 minutes at this temperature, the acid number was found to be zero. The reaction mixture was then cooled down to about 149° C. (300° F.) and 741 parts of methyl amyl ketone were added. The resulting resin had a viscosity of T½ at 80% solids.

EXAMPLES II–V

Epoxy ester resins for use in a coating according to the invention were prepared in the manner generally of Example I. The components employed are shown in Table A, below. The diepoxide, fatty acid and diphenol, with catalyst (sodium carbonate), if any, were charged in a suitable reactor. The mixture was heated up to about 177° C. (350° F.). At this point, exothermic reaction took place that brought the temperature up to about 188°–199° C. (370°–390° F.). The reaction was continued at this temperature until the acid number dropped below 6. Then the product was cooled down to about 121° C. (250° F.) and thinned to 80% non-volatiles by weight with methyl amyl ketone. In Table I, all amounts are shown in parts by weight.

TABLE A

|  | Example | | | |
|---|---|---|---|---|
|  | II | III | IV | V |
| Epon 829[1] | 500 | 500 |  |  |
| DER 333[2] |  |  | 500 |  |
| Epon 828[3] |  |  |  | 500 |
| Bisphenol A | 212 | 212 | 212 | 212 |
| Linseed Fatty Acid | 475 |  |  |  |
| Pamolyn 200[4] |  | 475 |  |  |
| Soya Fatty Acid |  |  | 475 | 475 |
| Sodium Carbonate |  |  |  | 0.5 |
| Methyl Amyl Ketone | 297 | 297 | 295 | 297 |
| % Non-Volatiles | 80.0 | 79.8 | 79.6 | 79.8 |
| Viscosity | V | W | X | X |
| Acid Number | 0.9 | 1.1 | 0.9 | 0.9 |

[1]Trademark, Shell Chemical Co. (diepoxide; specifically, bisphenol-A epichlorohydrin epoxy resin)
[2]Trademark, Dow Chemical Co. (diepoxide)
[3]Trademark, Shell Chemical Co. (diepoxide)
[4]Trademark, Hercules Incorporated, Wilmington, Delaware (pale, color-stable high purity grade linoleic acid)

EXAMPLE VI

An epoxy ester resin suitable for use in a coating composition according to the invention was prepared. In a suitable reactor were charged 268 parts of Araldite RD-2 (trademark) Ciba-Geigy Corporation (diglycidyl ether of 1,4-butane diol), 159 parts of bisphenol-A, 112 parts of Soya fatty acid and 0.3 parts of sodium carbonate. The temperature of the mixture was brought up to about 177° C. (350° F.) at which point an exothermic reaction took place that raised the temperature up to 193° C. (380° F.). After one hour at this temperature, the acid number was found to be 1.2. The reaction mixture was then cooled down to about 149° C. (300° F.) and 134 parts of methyl amyl ketone were added. The resulting resin had a viscosity of 0 to 80% solids.

EXAMPLE VII

An epoxy ester resin suitable for use in a coating composition according to the invention was prepared. In a suitable reactor were charged 392 parts of Epon 829 (trademark) Shell Chemical Company (diglycidyl ether of bisphenol-A), 174 parts of 4,4'-dihydroxy diphenyl sulfone and 112 parts of Soya fatty acid. The temperature of the mixture was brought up to about 177° C. (350° F.) at which point an exothermic reaction took place that raised the temperature up to 200° C. (392° F.). After one hour at this temperature, the acid number was found to be 0.8. The reaction mixture was then cooled down to about 149° C. (300° F.) and 152 parts of methyl amyl ketone were added. The resulting resin had a viscosity of X+ at 80% solids.

EXAMPLE VIII–X

This example illustrates the preparation of polymeric catalyst for use in a coating composition according to the present invention. The monomer components and t-butyl perbenzoate initiator, in the amounts shown in Table B, below, were combined with a small quantity of methyl amyl ketone solvent and added over a five hour period into refluxing methyl amyl ketone containing cumene hydroperoxide polymerization initiator. Following completion of the addition, the mixture was maintained at 149° C. (300° F.) for about one hour. Additional t-butyl peroxide initiator, ten percent (10%) by weight resins was then added and the mixture was maintained at 149° CV (300° F.) for about five hours. The mixture of Example IX and of Example X each was then stripped of solvent to the desired solids level, as listed in Table B. The viscosity and acid number of the polymeric catalyst product are shown in Table B. All component amounts are shown in parts by weight.

TABLE B

| Composition | Example VIII | Example IX | Example X |
|---|---|---|---|
| Methyl-amyl Ketone | 1500 | 1500 | 1500 |
| Butyl Methacrylate | 1050 | 1050 | — |
| Butyl Acrylate | — | — | 150 |
| Styrene | — | 150 | — |
| Acrylic Acid | 450 | 300 | 450 |
| t-Butyl Perbenzoate | 67 | 67 | 67 |
| Cumene Hydroperoxide | 37 | 37 | 37 |
| Solids (% by weight) | 50 | 80 | 75 |
| Viscosity | L | $Z_7$ | $Z_4$ |
| Acid Number | 238 | 152 | 235 |

EXAMPLE XI

A millbase, that is, a composition pigment paste were prepared by grinding in a ballmill the following mixture:

| Composition | Parts |
|---|---|
| Barium Sulfate | 1626 |
| Red Iron Oxide | 60 |
| Titanium dioxide | 105 |
| Silica | 75 |
| Strontium chromate | 99 |
| Polyethylene Wax | 48 |
| Xylene | 200 |
| Toluene | 240 |
| 2 ethyl hexanol | 57 |
| Resin of Example V | 264 |

EXAMPLES XII–XIII

Coating compositions according to the invention were prepared, each being adapted for use as a high solids, sprayable, pigmented primer for application over bare, unpolished steel automotive vehicle body panels in an automotive vehicle assembly operation. The coating composition components are shown in Table C, below. It should be noted that use of a drier is optional to catalyse reaction of fatty acid double bonds to provide additional crosslinking in the cured resin. In Table C, all component amounts are expressed in parts by weight.

TABLE C

|  | Example | |
|---|---|---|
|  | XII | XIII |
| Epoxy Ester Resin of Example I | 248 | 248 |
| Polymeric Catalyst of |  |  |
| Example VIII | 24 | — |
| Example X | — | 23 |
| Millbase of Example XI | 801 | 800 |
| Resimine 717[1] | 110 | 110 |
| 6% Manganese Naphthanate (Drier) | 4 | 4 |

TABLE C-continued

|  | Example | |
|---|---|---|
|  | XII | XIII |
| Butanol | 35 | 35 |

[1]Trademark, Monsanto Co., St. Louis, MO. (low temperature, high solids methylated melamine-formaldehyde resin crosslinking agent).

EXAMPLE XIV

The coating compositions of Examples XII and XIII were tested for storage stability. Each was maintained at 60° C. (140° F.) for a period of 16 hours. Stability was measured as the increase in seconds, #4 Ford Cup at 27° C. (80° F.). The results were as follows:

| Coating Compositions of Example XII: | 2 sec. |
|---|---|
| Coating Compositions of Example XIII: | 2 sec. |

EXAMPLES XV–XVI

The coating composition of Examples XII and XIII were spray applied to bare, unpolished Bonderite steel, cured, and tested for corrosion resistance and humidity resistance. The curing schedule and the results of the testing are shown in Table D, below. Corrosion is measured as inches of corrosion from scribe line following 240 hours salt spray. Humidity resistance is qualitatively evaluated following exposure to condensing humidity at 43° C. (110° F.).

TABLE D

|  | Example | |
|---|---|---|
|  | XV | XVI |
| Coating Composition | XII | XIII |
| Curing Schedule | 135° C. 15 min. | 135° C. 15 min. |
| Corrosion Resistance | ⅛" | ⅛" |
| Humidity Resistance | excel. | excel. |

EXAMPLE XVII

The procedure of Example I was repeated. Subsequently, 60 parts of methyl amyl ketone were stripped from the cooled, diluted reaction mixture. It was found that no significant amount of water was carried off with the solvent.

EXAMPLE XVIII

A coating composition of the present invention, specifically of Examples XII, was compared to other, commercially available, high solids coating compositions. The properties of the coating compositions and of the cured coating compositions are presented in Table E, below. It will be observed that the coating composition of the coating composition of the invention, although applied at a greater solids content (by weight and by volume) and, thus, at a lower V.O.C., has significantly lower viscosity.

TABLE E

|  | COMPOSITION OF EXAMPLE XII | COMPETITOR #1 | COMPETITOR #2 | COMPETITOR #3 |
|---|---|---|---|---|
| Application Viscosity (#4 F) | 18–20" | 24–26" | 25–26" | 28–30" |
| Application Volume Solids | 50 ± 1% | 46% | 49% | 48% |
| Application Weight Solids | 69 ± 1% | 66% | 67% | 68% |
| VOC @ Application Viscosity | 3.6–3.8 | 4.0 | 3.8 | 3.8–3.9 |
| Stability: |  |  |  |  |
| 16 hrs. @ 140° F. | +2" | +3" | +2" | +1" |
| 120 hrs. @ 140° F. | +5" | +9" | +10" | +5" |
| Gloss (20°) | 85 | 65 | 81 | 72 |
| D.I. | 60 | 16 | 53 | 5 |
| Tukon (Hardness) @ 275° F. | 13.2 | 7.0 | 7.2 | 16.2 |
| Corrosion Resistance Rating: |  |  |  |  |
| PTQ | 1 | 3 | 2 | 2 |
| Unpolished Bonderite Steel | 1 | 2 | 2 | 3 |
| Galvanized Steel | 1 | 1 | 1 | 1 |
| Cross Hatch Adhesion Rating (Enamel to Primer) | 1 | 1 | 2 | 2 |
| SAE Gravelometer Rating | 1 | 1 | 2 | 3 |
| Humidity Resistance Rating | 1 | 3 | 3 | 2 |

Note:
Rating system based on relative comparison: 1 = Best

EXAMPLE XIX

The following example illustrates the preparation of a coating composition of the present invention and, in particular, illustrates the hot blend method of mixing the polymeric catalyst with the epoxy ester resin. In a suitable reactor were charged 248 parts of resin of Example I and 33 parts of resin of Example VIII. The mixture was heated up to 104° C. (220° F.) and was stirred at this temperature for 2 hours. After the two hour period the mixture was cooled to room temperature and was added to a previously prepared mixture containing 800 parts of millbase of Example XI, 100 parts of Resimine 717 (trademark, Monsanto Company, St. Louis, Mo.), 4 parts of 6% manganese naphthanate drier, 35 parts of butanol, 3 parts of polybutyl acrylate and 15 parts of Butyl CELLOSOLVE Acetate (trademark, Union Carbide Corporation, New York, N.Y.). The mixture was subsequently thinned with methyl amyl ketone to a viscosity of about 18 seconds, #4 Ford Cup at 27° C. A number of unpolished Bonderite steel panels were sprayed and baked at different temperatures (baking schedules: 250° F. × 15 mins.; 275° F. × 15 mins.; 300° F. × 20 mins.; 325° F. × 30 mins.; 380° F. × 60 mins.). Corrosion resistance of the panels after exposure to salt spray tests for 240 hrs. was excellent (less than 2/8" corrosion from scribe). Additional panels coated and baked at the schedules shown above were top-coated with white enamel. These panels were tested and exhibited excellent humidity resistance, and chip resistance and adhesion (gravelometer tests). The above coating composition, after 16 hrs. at 60° C. (140° F.) showed only 2 seconds increase in viscosity (#4 Ford Cup) and, after 5 days at 60° C. (140° F.), showed only 5 seconds increase.

EXAMPLE XX-XXVII

Coating compositions according to the present invention are suitably prepared according to the method of Example XIX employing components in the amounts shown in Table F, below. In each case, the properties of the coating composition and of the cured coating made therefrom, specifically storage stability of the coating composition and corrosion resistance, humidity resistance, chip resistance and adhesion of the cured coatings, are found to be excellent, except that the storage stability of the coating composition of Example XXVII is less due to the use therein of phenyl acid phosphate (i.e., non-polymeric) catalyst.

TABLE F

| | Example | | | | | | | |
|---|---|---|---|---|---|---|---|---|
| | XX | XXI | XXII | XXIII | XXIV | XXV | XXVI | XXVII |
| Millbase of Example XI | 800 | 800 | 800 | 800 | 800 | 800 | 800 | 800 |
| Epoxy ester resin of | | | | | | | | |
| Example I | 248 | | | | | | | 248 |
| Example II | | 248 | | | | | | |
| Example III | | | 248 | | | | | |
| Example IV | | | | 248 | | | | |
| Example V | | | | | 248 | | | |
| Example VI | | | | | | 248 | | |
| Example VII | | | | | | | 248 | |
| Polymeric catalyst of | | | | | | | | |
| Example VIII | | 35 | | | 35 | 35 | 35 | 15 |
| Example IX | 30 | | 25 | | | | | |
| Example X | | | | 25 | | | | |
| Phenyl acid phosphate | | | | | | | | 1 |
| Resimine 717[1] | 110 | 110 | | | 110 | 110 | 110 | 110 |
| Cymel 325[2] | | | 110 | 110 | | | | |
| 6% Manganese Naphthenate | 4 | 4 | 4 | 4 | 4 | 4 | 4 | 4 |
| Butanol | 40 | 35 | 40 | 35 | 40 | 40 | 40 | 40 |
| Butyl Cellosolve Acetate[3] | 15 | 15 | 15 | 15 | 15 | 15 | 15 | 15 |

[1]Trademark, Monsanto Co., St. Louis, MO. (low temperature, high solids methylated melamine-formaldehyde resin crosslinking agent).
[2]Trademark, American Cyanamid Company, Wayne, New Jersey (highly methylated melamine formaldehyde resin).
[3]Trademark, Union Carbide Corporation, New York, New York (ethylene glycol monobutyl ether acetate)

In view of this disclosure, many modifications of this invention will be apparent to those skilled in the art. It is intended that all such apparent modifications fall within the true scope of this invention and be included within the terms of the appended claims.

INDUSTRIAL APPLICABILITY

It will be apparent from the foregoing that this invention has industrial applicability as a coating composition, especially as a high solids primer coat composition for automotive vehicles, household appliances and the like, and other applications where the coating composition desirably has excellent storage stability and the cured coating desireably provides excellent humidity and solvent resistance to protect a substrate, for example a metal substrate, against corrosion, wear and the like.

What is claimed is:

1. A novel, organic solvent based, thermosetting coating composition comprising:
   A. epoxy ester resin of number average molecular weight ($M_n$) about 900 to about 5000, being the reaction product of diepoxide with (i) diphenol in chain extension reaction and (ii) monobasic fatty acid in chain terminating esterification reaction, which chain extension and esterification reaction occur substantially simultaneously at a reaction temperature reaching at least about 175° C., wherein the epoxy functionality, phenol functionality and carboxyl functionality are employed in relative proportions of about 1:0.4–1:0.4–1 equivalents, respectively;
   B. polyfunctional aminoplast crosslinking agent; and
   C. polycarboxy functional polymeric catalyst of number average molecular weight ($M_n$) about 1,000–10,000 being substantially unreactive at room temperature with the epoxy ester resin and the polyfunctional aminoplast crosslinking agent, in an amount of about 2% to about 15% by weight of resin solids in the coating composition.

2. The solvent based, thermosetting coating composition of claim 1, wherein said epoxy ester resin number average molecular weight is about 900 to about 2000.

3. The solvent based, thermosetting composition of claim 2, wherein said diepoxide has a number average molecular weight of about 100–1000.

4. The solvent based, thermosetting coating composition of claim 1, wherein said diepoxide is selected from the group consisting of bisphenol-A epichlorohydrin epoxy resin, hydantoin epoxy resin, cyclic and acyclic aliphatic diepoxide, and the like and a mixture of any of them.

5. The solvent based, thermosetting coating composition of claim 1, wherein said diepoxide bears two terminal epoxide groups.

6. The solvent based, thermosetting coating composition of claim 1, wherein said diepoxide is diglycidyl ether bisphenol-A resin.

7. The solvent based, thermosetting coating composition of claim 1, wherein the diphenol has a number average molecular weight of about 180–500.

8. The solvent based, thermosetting coating composition of claim 1, wherein said diphenol is of the general formula:

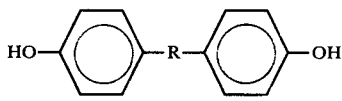

wherein R is a divalent, organic, linking moiety substantially unreactive with the epoxy functionality of the diepoxide resin.

9. The solvent based, thermosetting coating composition of claim 8, wherein R is selected from the group consisting of an alkylene or alkylidene moiety of one to about 10 carbons and the like and a mixture thereof.

10. The solvent based, thermosetting coating composition of claim 8, wherein R is
wherein R' and R" are the same or different and each is selected from the group consisting of hydrogen and alkyl of 1 to about 4 carbons, and the like and a mixture of any of them.

11. The solvent based, thermosetting coating composition of claim 1, wherein said diphenol is selected from the group consisting of bisphenol-A, bisphenol-B and the like and a compatible mixture of any of them.

12. The solvent based, thermosetting coating composition of claim 1 or 5, wherein said diphenol consists of bisphenol-A.

13. The solvent based, thermosetting coating composition of claim 1, wherein said fatty acid is selected from the group consisting of fatty acids of about 8 to about 18 carbons and a mixture of any of them.

14. The solvent based, thermosetting coating composition of claim 1, wherein said fatty acid consists of substantially saturated aliphatic fatty acid.

15. The solvent based, thermosetting coating composition of claim 1, 6 or 11 wherein said fatty acid consists of Soya fatty acid.

16. The solvent based, thermosetting coating composition of claim 1, 6, 11 or 14 wherein said polyfunctional aminoplast crosslinking agent consists of hexa(methoxymethyl)melamine and the like and a compatible mixture thereof.

17. The solvent based, thermosetting coating composition of claim 1, 6, 11 or 14 wherein said diepoxide, said phenol and said fatty acid are employed in relative amounts of about 1:0.7:0.6 equivalents, respectively.

18. The solvent based, thermosetting coating composition of claim 1, wherein said polycarboxy functional polymeric catalyst has a number average molecular weight ($M_n$) about 1,500–3,000.

19. The solvent based, thermosetting coating composition of claim 1, 6, 11 or 14 wherein said polycarboxy functional polymeric catalyst comprises the reaction product of (i) ethylenically unsaturated carboxylic acid, with (ii) ethylenically unsaturated copolymerization monomer which provides to said reaction product no functionality substantially reactive at room temperature with said epoxy ester resin or said polyfunctional aminoplast crosslinking agent.

20. The solvent based, thermosetting coating composition of claim 19, wherein said carboxylic acid is selected from the group consisting of acrylic acid, methacrylic acid, butanoic acid and the like and a compatible mixture of any of them.

21. The solvent based, thermosetting coating composition of claim 20, wherein said copolymerizable monomer is selected from the group consisting of glycidyl acrylate, glycidyl methacrylate, styrene, vinyl ether and the like or a compatible mixture of any of them.

22. The solvent based, thermosetting coating composition of claim 19, wherein said polycarboxy functional polymeric catalyst is the reaction product of about 20–45% by weight of said carboxylic acid monomers with about 55–80% by weight of said copolymerization monomers.

23. The solvent based, thermosetting coating composition of claim 22, wherein said polycarboxy functional polymeric catalyst consists of the polymerization reaction product of about 30% by weight acrylic acid with about 70% by weight butyl methacrylate.

24. The solvent based, thermosetting coating composition of claim 1, wherein said polycarboxy functional polymeric catalyst is used in an amount of about 5% to about 10% by weight of resin solids in the coating composition.

25. The solvent based, thermosetting coating composition of claim 1, wherein said polycarboxy functional polymeric catalyst is used in an amount sufficient to raise the acid level of the epoxy ester resin to about 15 to about 35.

26. The solvent based, thermosetting coating composition of claim 1, 6, 11 or 14 wherein said polycarboxy functional polymeric catalyst is mixed with the epoxy ester resin at a temperature at or above about 105° C.

27. A sprayable, pigmented high solids primer adapted for use on bare metal substrate, comprising the coating composition of claim 1, 6, 11 or 14 wherein the volatile organic content is less than about 400 g/l and the viscosity no greater than about 35 sec., #4 Ford Cup at 27° C.

28. The sprayable, pigmented, high solids primer of claim 27 wherein the pigment to resin ratio is about 1:1 to about 2:1, respectively.

29. A novel, organic solvent based, thermosetting coating compositions comprising:
A. epoxy ester resin of number average molecular weight ($M_n$) about 900 to about 2000, being the reaction product of diepoxide consisting essentially of diglycidyl ether bisphenol-A resin with (i) diphenol consisting essentially of bisphenol-A, in chain extension reaction, (ii) monobasic fatty acid consisting essentially of Soya fatty acid, in chain termination esterification reaction, and (iii) catalyst for said chain extension and esterification reactions, which reactions occur substantially simultaneously at a reaction temperature reaching at least about 175° C., wherein the epoxy functionality, phenol functionality and carboxyl functionality are employed in relative proportions of about 1:0.7:0.6 equivalents, respectively;
B. polyfunctional aminoplast crosslinking agent; and
C. polycarboxy functional polymeric catalyst of number average molecular weight ($M_n$) about 1,000–10,000 being substantially unreactive at room temperature with the epoxy ester resin and the polyfunctional aminoplast crosslinking agent, in an amount of about 2% to about 15% by weight of resin solids in the coating composition.

30. A sprayable, pigmented, high solids primer adapted for use on bare metal substrate, comprising the coating composition of claim 29 wherein the volatile organic content is less than about 400 g/l and the viscosity no greater than about 35 sec., #4 Ford Cup at 27° C.

* * * * *